(12) United States Patent
Riley

(10) Patent No.: US 8,374,175 B2
(45) Date of Patent: Feb. 12, 2013

(54) SYSTEM AND METHOD FOR REMOTE DIRECT MEMORY ACCESS OVER A NETWORK SWITCH FABRIC

(75) Inventor: Dwight D. Riley, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1767 days.

(21) Appl. No.: 11/116,008

(22) Filed: Apr. 27, 2005

(65) Prior Publication Data

US 2005/0238035 A1    Oct. 27, 2005

Related U.S. Application Data

(60) Provisional application No. 60/565,602, filed on Apr. 27, 2004.

(51) Int. Cl.
*H04L 12/50* (2006.01)
*H04Q 11/00* (2006.01)
*G06F 13/28* (2006.01)

(52) U.S. Cl. ............. 370/386; 370/401; 710/22
(58) Field of Classification Search .......... 370/401
See application file for complete search history.

(56) References Cited

U.S. PATENT DOCUMENTS

| | | | |
|---|---|---|---|
| 6,067,590 A | 5/2000 | Pettey et al. | |
| 6,072,781 A * | 6/2000 | Feeney et al. | 370/282 |
| 6,266,731 B1 | 7/2001 | Riley et al. | |
| 6,557,068 B2 | 4/2003 | Riley et al. | |
| 6,816,934 B2 | 11/2004 | Riley et al. | |
| 2002/0141427 A1* | 10/2002 | McAlpine | 370/413 |
| 2003/0099254 A1* | 5/2003 | Richter | 370/466 |
| 2004/0024944 A1 | 2/2004 | Riley | |
| 2004/0030731 A1* | 2/2004 | Iftode et al. | 707/205 |
| 2004/0037299 A1* | 2/2004 | Pandya | 370/401 |
| 2005/0033893 A1 | 2/2005 | Pettey et al. | |
| 2005/0102682 A1* | 5/2005 | Shah et al. | 719/321 |

OTHER PUBLICATIONS

"InfiniBand Linux SourceForge Project: Overview," last updated May 2, 2002, 4 pp. [Online] http://infiniband.sourceforge.net/overview.htm.
"Architectures and Infrastructures for Blade Computing," Sun Microsystems, Inc., Sep. 2002, 17 pp.
"Realizing the Full Potential of Server, Switch & I/O Blades with InfinBand Architecture," Mellanox Technologies, Inc., Rev. 1.20, 11 pp. [Online] http://www.mellanox.com/technology/shared/Blade_WP_120.pdf.
S. Bailey et al., "The Architecture of Direct Data Placement (DDP) and Remote Direct Memory Access (RDMA) on Internet Protocols," Feb. 2005, 22 pp.
A. Romanow et al., "Remote Direct Memory Access (RDMA) over IP Problem Statement," Oct. 2004, 21 pp.
R. Recio et al., "An RDMA Protocol Specification," Feb. 1, 2005, 75 pp. (38 pp., double-sided).
A. Cohen, "RDMA Offers Low Overhead, High Speed," Network World, Mar. 24, 2003, 3 pp.
K. Meier, "OS Bypass Eliminates Overhead," Network World, Jan. 31, 2005, 3 pp.

(Continued)

*Primary Examiner* — Andrew Chriss

(57) ABSTRACT

A system and method for remote direct memory access over a network switch fabric. Some illustrative embodiments may include a system comprising a first system node, a direct memory access (DMA) controller, a second system node, and a network switch fabric coupling together the first and second system nodes (the network switch fabric comprises a rooted hierarchical bus). The DMA controller is configured to perform a DMA transfer of data between the first and second system nodes across the network switch fabric. The data is formatted as one or more remote DMA (RDMA) protocol messages that are routed across the network switch fabric based on a bus end-device identifier corresponding to the second system node.

18 Claims, 12 Drawing Sheets

OTHER PUBLICATIONS

P. Hochmuth, "Vendors Push Switch Standard," Network World, Feb. 2, 2004, 2 pp.

K. Deirling, "Advanced System Architectures Drive Choice of Switch Fabric Solution," Cots Journal, Apr. 2004, 5 pp.

V. Krishnan et al., "Comparing TCP/IP Ethernet with Advanced Switching for Intra-System Processor-to-Processor Communication," ASI-SIG, 16 pp. [Online] http://www.asi-sio.org/education/whitepapers/RDMA Whitepaper.pdf.

T. Miller, "PCI Express Base is just the Beginning," CompactPCI and Advanced TCA Systems, Jun. 25, 2004, 4 pp.

D. D. Riley, "System and Method for a Hierarchical Interconnect Network," U.S. Appl. No. 11/078,851, filed Mar. 11, 2005, 22 pp.

\* cited by examiner

SYSTEM AND METHOD FOR REMOTE DIRECT MEMORY ACCESS OVER A NETWORK SWITCH FABRIC

CROSS-REFERENCE TO RELATED APPLICATION

The present application claims priority to, and incorporates by reference, provisional application Ser. No. 60/565,602, filed Apr. 27, 2004, and entitled "Multi-Host Extension for PCI."

BACKGROUND

Ongoing advances in distributed multi-processor computer architectures have continued to drive improvements in the various technologies used to interconnect processors, as well as their peripheral components. As the speed of processors has increased, the underlying interconnect, intervening logic, and the overhead associated with transferring data to and from the processors have all become increasingly significant factors impacting performance. Performance improvements have been achieved through the use of faster networking technologies (e.g., Gigabit Ethernet), network switch fabrics (e.g., Infiniband, and RapidIO), TCP offload engines, and zero-copy data transfer techniques (e.g., remote direct memory access).

But many of the interconnect technologies currently in use require converting from the underlying interconnect architecture of the processors to the interconnect architecture of the network or network switch fabric. This may require additional and sometimes proprietary intervening hardware (e.g., host channel adapters). These interconnect technologies also may add processing layers to the communication protocol stack (e.g., Advanced Switching), adding to the overhead of the data transactions.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections. Additionally, the term "software" refers to any executable code capable of running on a processor, regardless of the media used to store the software. Thus, code stored in non-volatile memory, and sometimes referred to as "embedded firmware," is within the definition of software. Further, the term "system" refers to a collection of two or more parts and may be used to refer to a computer or networking system or a portion of a computer or networking system.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1A:
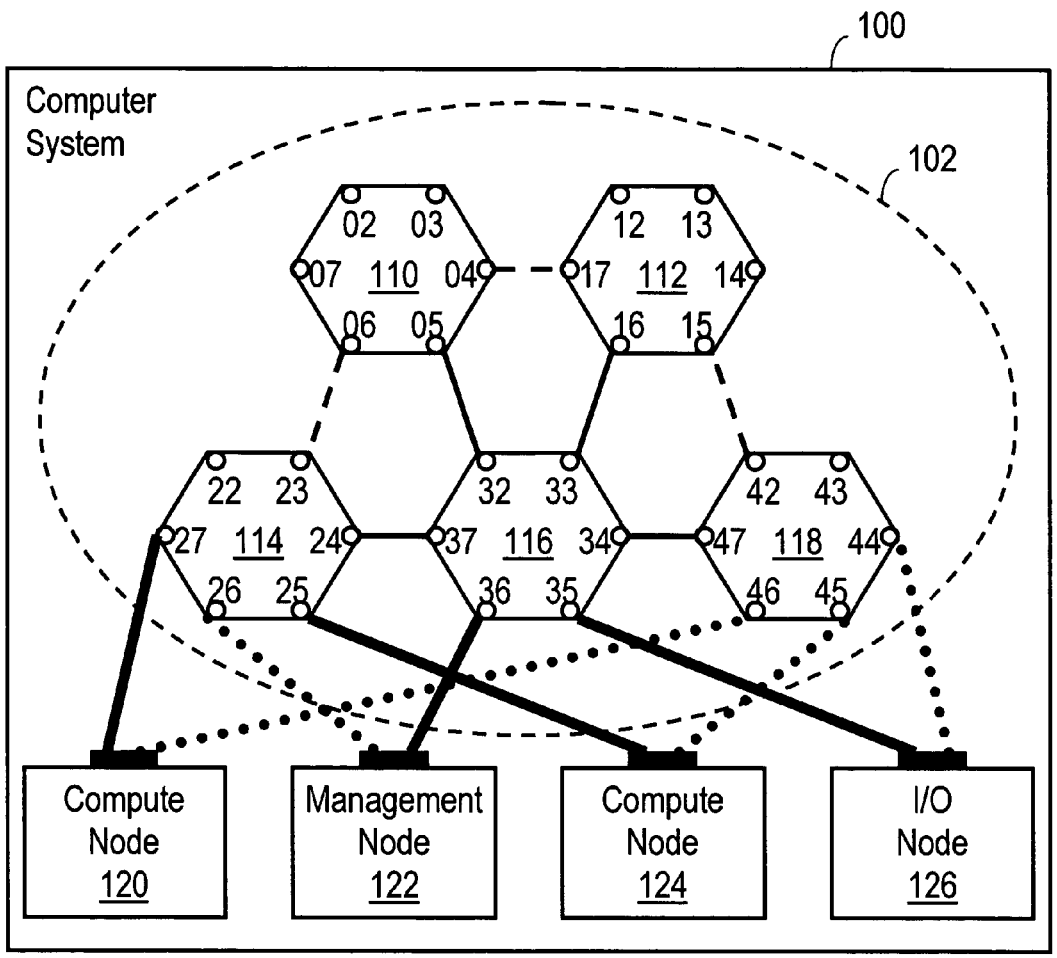
FIG. 1A shows a computer system constructed in accordance with at least some embodiments.

Interconnect busses have been increasingly extended to operate as network switch fabrics within distributed multi-processor computer systems. These computer systems may comprise several components or "nodes" that are interconnected by the network switch fabric. The network switch fabric may provide redundant or alternate paths that interconnect the nodes and allow them to exchange data. FIG. 1A illustrates a computer system 100 with a network switch fabric 102 comprising switches 110 through 118 and constructed in accordance with at least some embodiments. The computer system 100 also comprises data processing (compute) nodes 120 and 124, management node 122, and input/output (I/O) node 126.

Each of the nodes within the computer system 100 couples to at least two of the switches within the network switch fabric. Thus, in the embodiment illustrated in FIG. 1A, compute node 120 couples to both port 27 of switch 114 and port 46 of switch 118; management node 122 couples to port 26 of switch 114 and port 36 of switch 116; compute node 124 couples to port 25 of switch 114 and port 45 of switch 118; and I/O node 126 couples to port 35 of switch 116 and port 44 of switch 118.

By providing both an active and alternate path a node may send and receive data across the network switch fabric over either path based on such factors as switch availability, path latency, and network congestion. Thus, for example, if management node 122 needs to communicate with I/O node 126, but switch 116 has failed, the transaction may still be completed by using an alternate path through the remaining switches. One such path, for example, may be through switch 114 (ports 26 and 23), switch 110 (ports 06 and 04), switch 112 (ports 17 and 15), and switch 118 (ports 42 and 44).

Figure 1B:
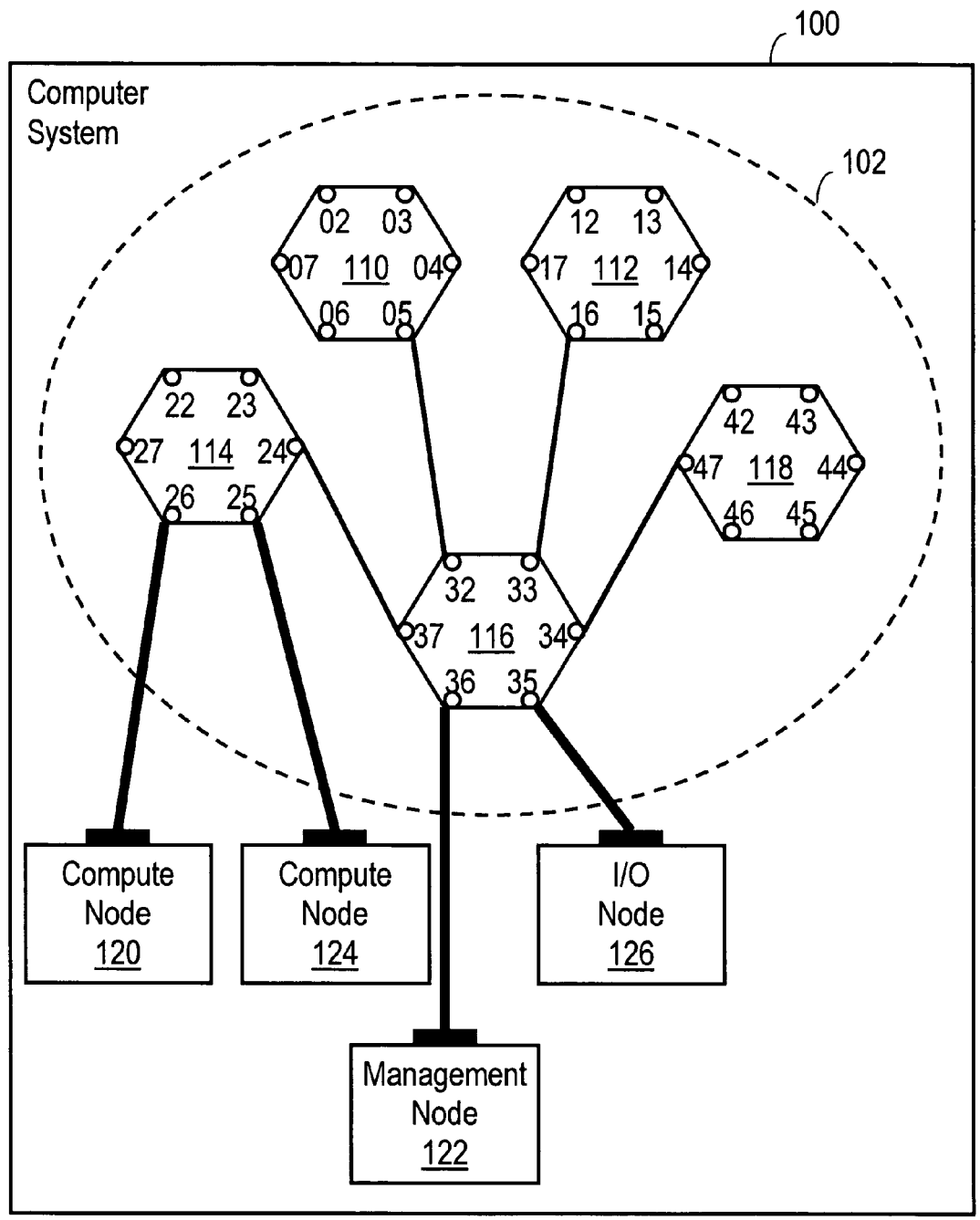
FIG. 1B shows the underlying hierarchical structure of a network switch fabric within a computer system constructed in accordance with at least some embodiments.

Because the underlying hierarchical bus structure of the network switch fabric 102, illustrated in FIG. 1B, does not support alternate paths as described, extensions to identify alternate paths may be provided to the process by which each node and switch port is mapped within the hierarchy upon initialization of the network switch fabric 102. The addition of these extensions allows the underlying hierarchical bus structure to operate as a network switch fabric that uses a consistent bus architecture throughout the computer system 100. The extensions may be implemented within the switches so that hardware and software installed within the various nodes of the computer system 100, and already compatible with the underlying bus structure of the network switch fabric 102, may be used in conjunction with the network switch fabric 102 with little or no modification.

Figure 2:
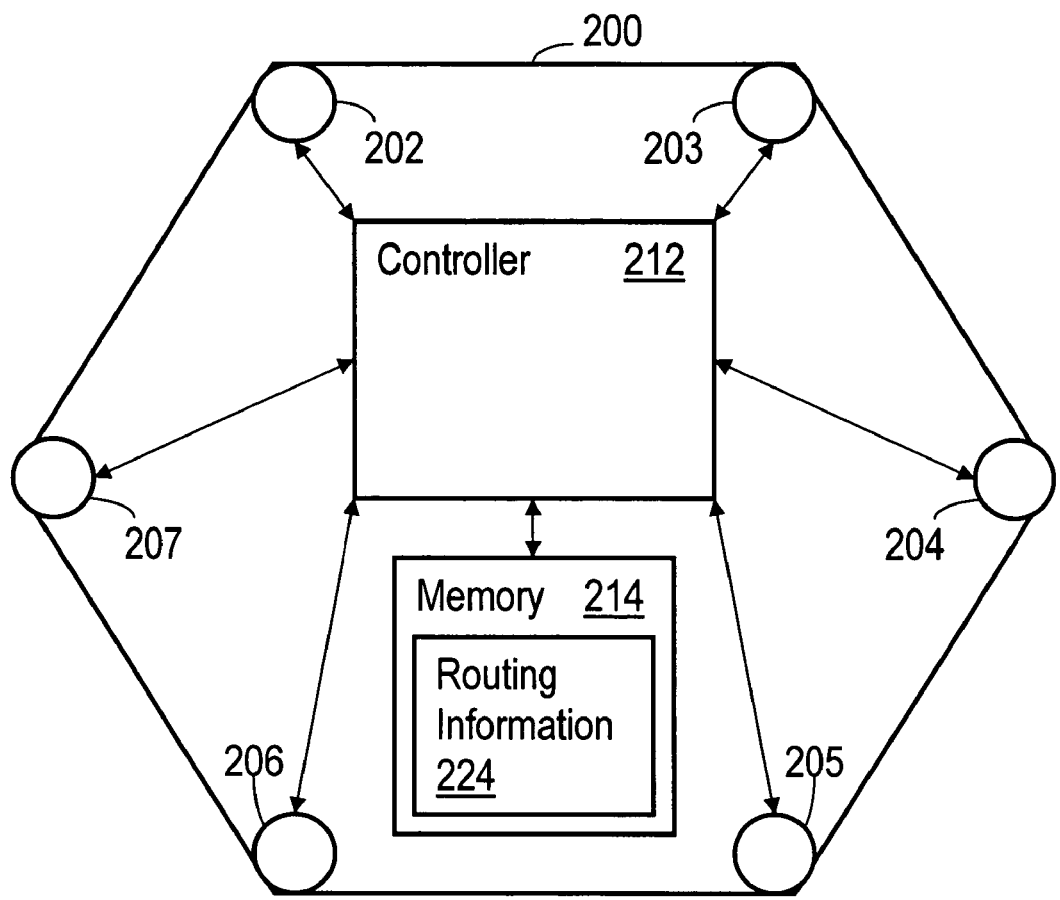
FIG. 2 shows a network switch constructed in accordance with at least some embodiments.

FIG. 2 illustrates a switch 200 implementing such extensions for use within a network switch fabric, and constructed in accordance with at least some embodiments. The switch 200 comprises a controller 212 and memory 214, as well as a plurality of communication ports 202 through 207. The controller 212 couples to the memory 214 and each of the communication ports. The memory 214 comprises routing information 224. The controller 212 determines the routing information 224 upon initialization of the network switch fabric and stores it in the memory 214. The controller 212 later uses the routing information 224 to identify alternate paths. The routing information 224 may comprise whether a port couples to an alternate path, and if it does couple to an alternate path, which endpoints within the computer system 100 are accessible through that alternate path.

In at least some embodiments the controller 212 may be implemented as a state machine that uses the routing information based on the availability of the active path. In other embodiments, the controller 212 may be implemented as a processor that executes software (not shown). In such an embodiment the switch 200 would be capable of using the routing information based on the availability of the active path, and would also be capable of making more complex routing decisions based on factors such as network path length, network traffic, and overall data transmission efficiency and performance. Other factors may become apparent to those skilled in the art, and such variations are intended to be within the scope of this disclosure.

Figure 3:
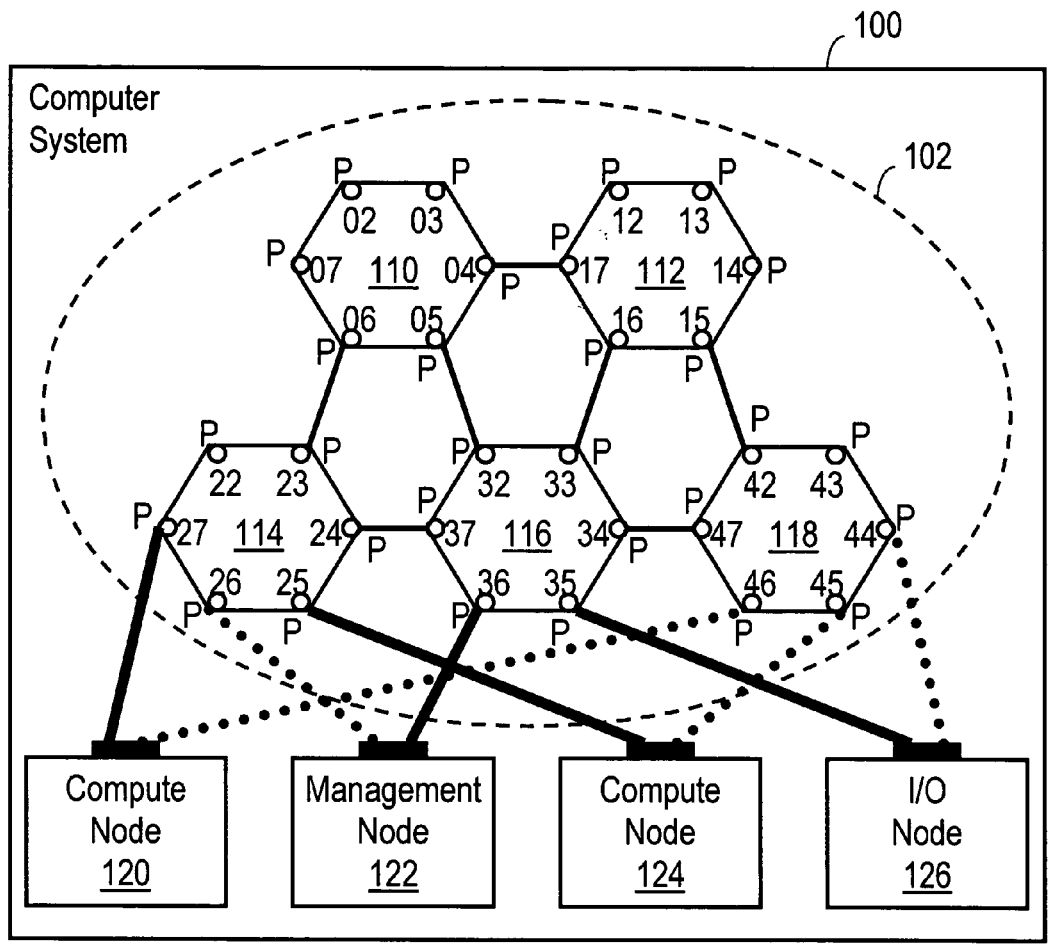
FIG. 3 shows the state of a computer system constructed in accordance with at least some embodiments after a reset.
Figure 4:
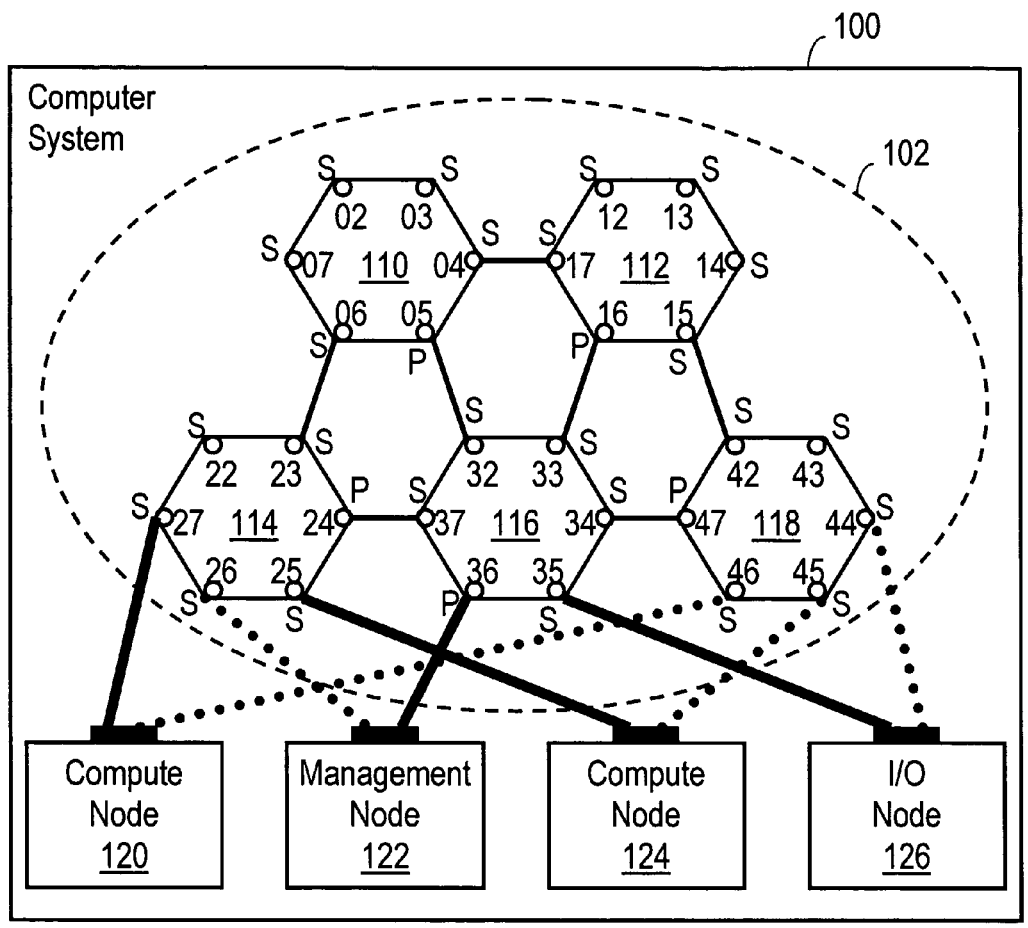
FIG. 4 shows the state of a computer system constructed in accordance with at least some embodiments after identifying the secondary ports.
Figure 5:
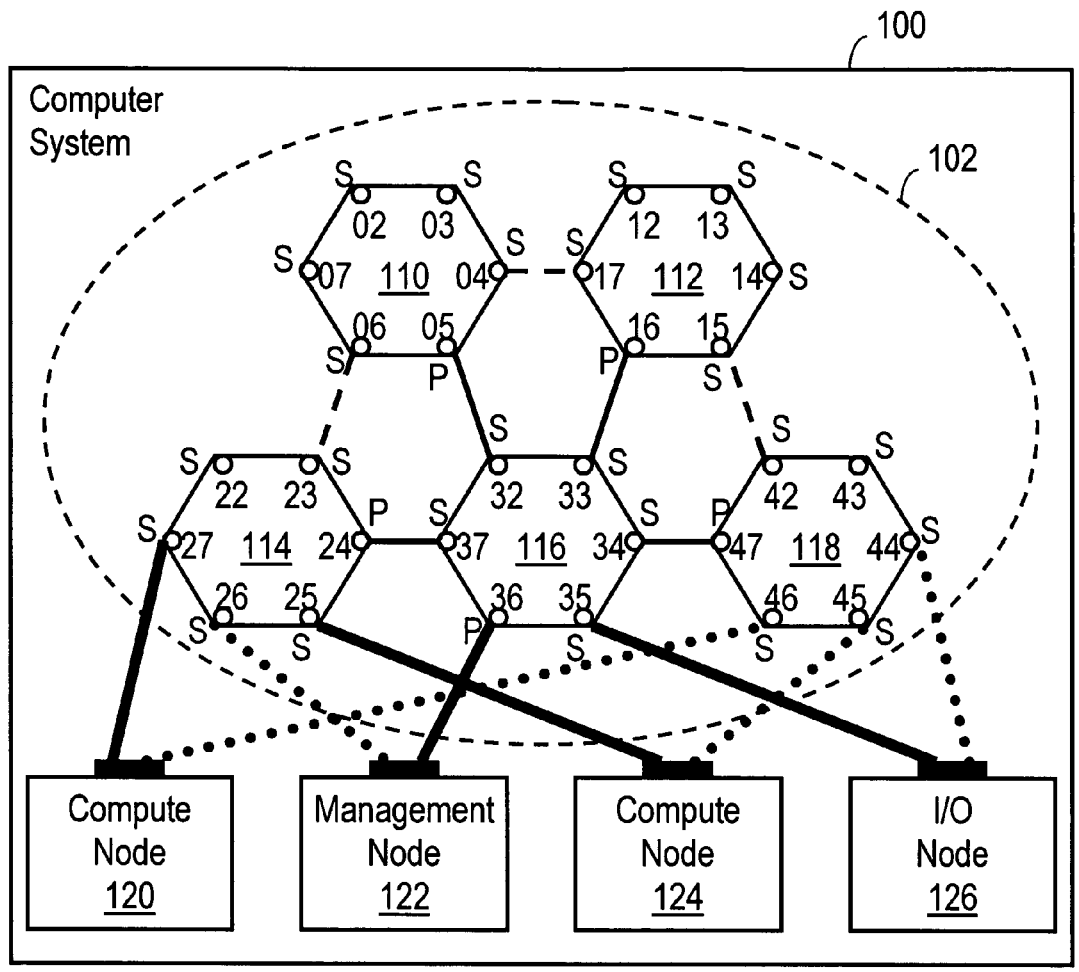
FIG. 5 shows the state of a computer system constructed in accordance with at least some embodiments after designating the alternate paths.

The initialization of the network switch fabric may vary depending upon the underlying bus architecture. FIGS. 3 through 5 illustrate initialization of a network switch fabric based upon a peripheral component interconnect (PCI) architecture and in accordance with at least some embodiments. Referring to FIG. 3, upon resetting the computer system 100, switches 110 through 118 each identify their ports as primary ports (designated by a "P" in FIG. 3). Similarly, the paths between the switches are initially designated as active paths. The management node 122 then begins a configuration cycle in which each switch port and endpoint within the hierarchy is identified (referred to in the PCI architecture as "enumeration"), and in which the primary bus coupled to the management node is closest to the Root Complex or Host-Bride within a PCI hierarchy. The configuration cycle comprises accessing configuration data stored in the each device coupled to the network switch fabric (e.g., the PCI configuration space of a PCI device). The switches comprise data related to devices that are coupled to the switch. If the configuration data regarding other devices stored by each switch is not complete, the management node may initiate additional configuration cycles until all devices coupled to the switches have been identified and the configuration data within each switch is complete.

By enumerating the switches and end-devices with respect to the management node, a consistent system-wide enumeration is achieved that allows multiple compute nodes to access all other nodes within the system. In the context of the illustrative PCI-based network switch fabric 102 of FIG. 3, this enumeration allows multiple compute nodes to be visible to each other and to interact in a manner similar to processors within a multi-processor system interconnected by a local area network.

Referring now to FIG. 4, when switch 116 detects that the management node 122 has initiated a first valid configuration cycle identifying the primary port, switch 116 identifies all other ports as secondary ports (designated by an "S" in FIG. 4). Subsequent valid configuration cycles may be propagated to each of the switches coupled to the secondary ports of switch 116, causing those switches to identify as secondary each of their ports not coupled to the switch propagating the configuration cycle (here switch 116). Thus, in one possible enumeration model, switch 116 will end up with port 36 identified as a primary port, and switches 110, 112, 114, and 118 with ports 05, 16, 24, and 47 identified as primary ports, respectively.

As ports are identified during each valid configuration cycle of the initialization process, each port reports its configuration (primary or secondary) to the port of any other switch to which it is coupled. Once both ports of two switches so coupled to each other have initialized, each switch determines whether or not both ports have been identified as secondary. If at least one port has not been identified as a secondary port, the path between them is designated as an active path within the bus hierarchy of the underlying bus architecture. If both ports have been identified as secondary ports, the path between them is designated as a redundant or alternate path. Routing information regarding other ports or endpoints accessible through each switch (segment numbers within the PCI architecture) is then exchanged between the two ports at either end of the path coupling the ports, and each port is then identified as an endpoint within the bus hierarchy. The result of this process is illustrated in FIG. 5, with the redundant or alternate paths shown by dashed lines between coupled secondary switch ports.

Figure 6:
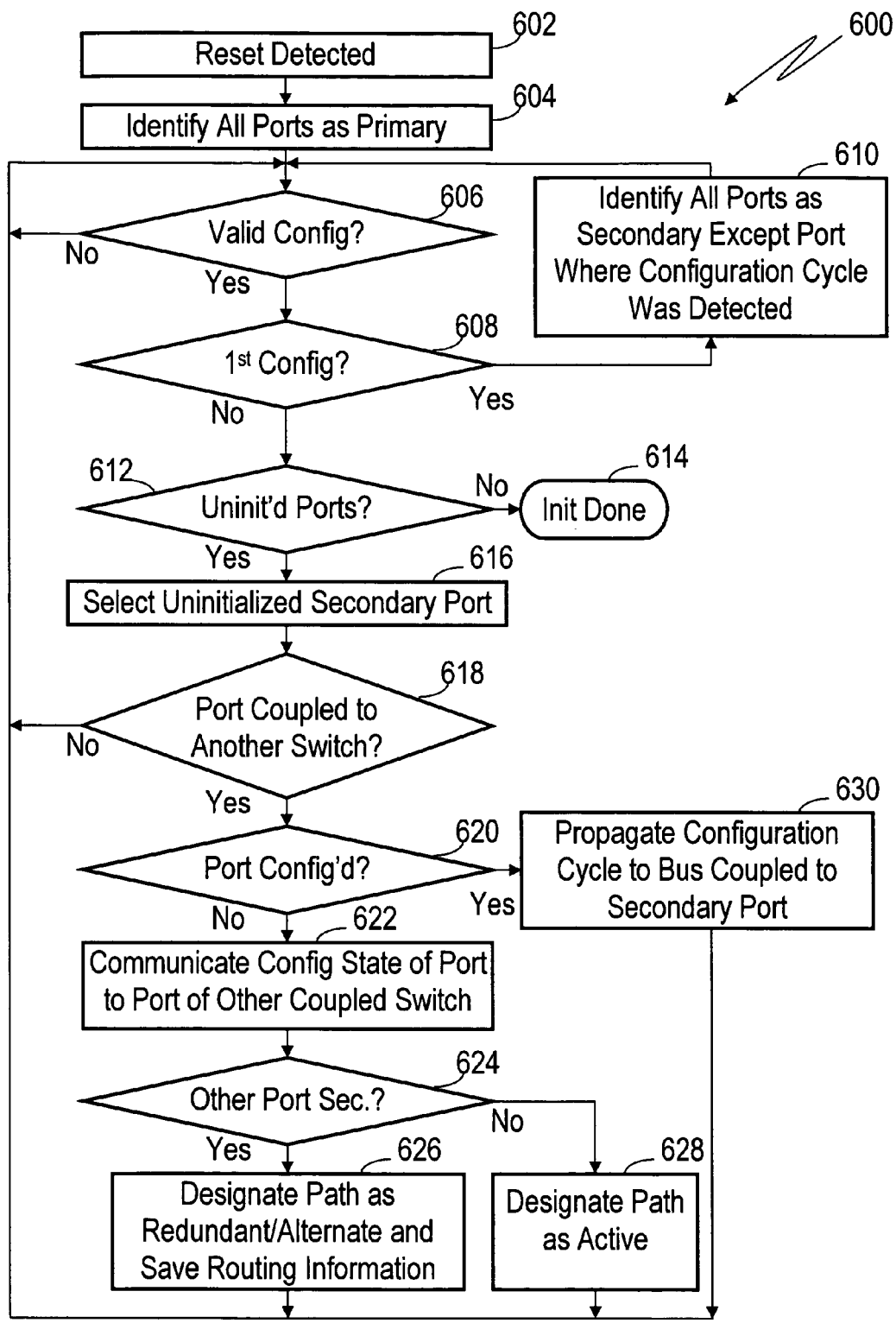
FIG. 6 shows an initialization method in accordance with at least some embodiments.

FIG. 6 illustrates initialization method 600 usable in a switch built in accordance with at least some embodiments. After the switch detects a reset in block 602 all the ports of the switch are identified as primary ports as shown in block 604. A wait state is entered in block 606 until the switch detects a valid configuration cycle. If the detected configuration cycle is the first valid configuration cycle (block 608), the switch identifies as secondary all ports other than the port on which the configuration cycle was detected, as shown in block 610.

After processing the first valid configuration cycle, subsequent valid configuration cycles may cause the switch to initialize the remaining uninitialized secondary ports on the switch. If no uninitialized secondary ports are found (block 612), all end-devices have been discovered, each has been assigned an end-device ID (e.g., a PCI device ID comprising a bus, device and function number), and the initialization method 600 is complete (block 614). If an uninitialized secondary port is identified (block 612) the identified secondary port is selected in block 616. If the selected secondary port is not coupled to another switch (block 618), no further action on the selected secondary port is required (the selected secondary port is initialized).

If the secondary port selected in block 616 is coupled to another switch (block 618) and the selected secondary port has not yet been configured (block 620), the selected secondary port communicates its configuration state to the port of the other switch to which it couples (block 622). If the port of the other switch is also a secondary port (block 624) the path between the two ports is designated as a redundant or alternate path and routing information associated with the path is saved (block 626). If the port of the other switch is not a secondary port (block 624) the path between the two ports is designated as an active path (block 628). After configuring the path as either active or redundant/alternate, the port is configured and the process is repeated by again waiting for a valid configuration cycle in block 606.

If the port is found to have already been configured in block 620, the valid configuration cycle is propagated to all appropriate busses coupled to the selected secondary port. This may include a first bus coupled to the port selected in block 616, as well as additional busses coupled to other switches that also couple to the selected switch through the first bus. When all ports on all switches coupled to the selected secondary port have been configured, the port is initialized. Multiple configuration cycles may be needed to complete the initialization of the selected secondary port. After the selected secondary port has been initialized, the process is again repeated for subsequent uninitialized ports until all secondary ports within the switch have been initialized.

Once the initialization process has completed and the computer system begins operation, data packets may be routed as needed through alternate paths identified during initialization. For example, referring again to FIG. 5, when a data packet is sent by management node 122 to I/O node 126, it is routed from port 36 to port 34 of switch 116. But if switch 116 were to fail, management node 122 would then attempt to send its data packet through switch 114 (via the node's secondary path to that switch). Without switch 116, however there is no remaining active path available and an alternate path must be used. When the data packet reaches switch 114, the extended information stored in the switch indicates that port 23 is coupled to a switch that is part of an alternate path leading to I/O node 126. The data packet is then routed to port 23 and forwarded to switch 110. Each intervening switch then repeats the routing process until the data packet reaches its destination.

Figure 7:
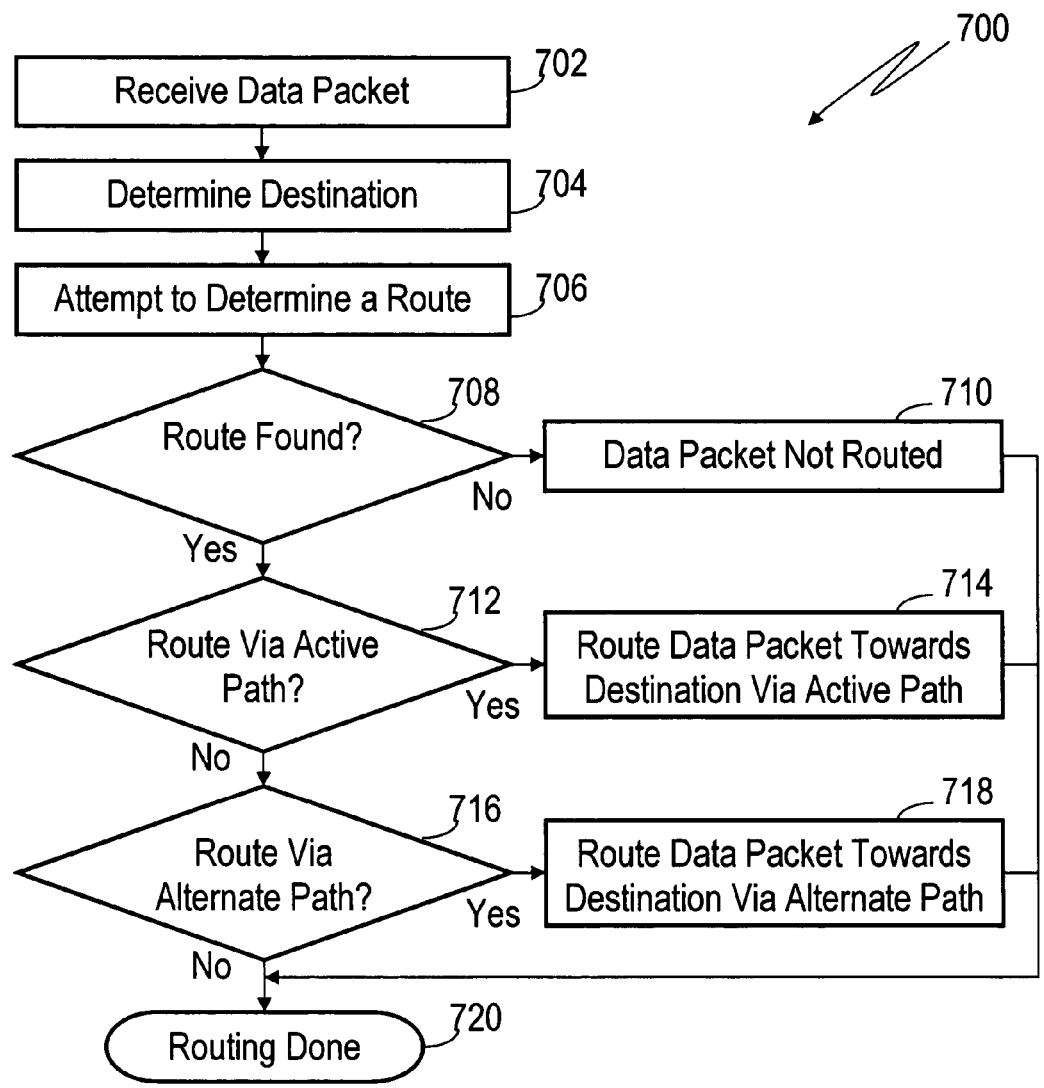
FIG. 7 shows a routing method in accordance with at least some embodiments.

FIG. 7 illustrates routing method 700 usable in a switch built in accordance with at least some embodiments. The switch receives a data packet in block 702, and determines the destination of the data packet in block 704. This determination may be made comparing routing information stored in the switch with the destination of the data packet. The routing information may describe which busses and devices are accessible through a particular port (e.g., segment numbers within the PCI bus architecture). Based on the destination, the switch attempts to determine a route to the destination through the switch (block 706). If a route is not found (block 708), the data packet is not routed (block 710). If a route is found (block 708) and the determined route is through an active path (block 712), then the data packet is routed towards the destination through the identified active path (block 714). If a route is found and the determined route is through an alternate path (block 716), then the data packet is routed towards the destination through the identified alternate path (block 718). After determining the path of the route (if any) and routing the data packet (if possible), routing is complete (block 720).

The performance of data transfers across the network fabric of FIG. 1A may be enhanced through the use of remote direct memory access (RDMA) data transfers. RDMA data transfers move data between nodes within a distributed computer system with little or no involvement of the central processing units (CPUs) of any of the nodes. RDMA data transfers may also transfer data between buffers on each node without intervening or intermediate buffering. The source and destination buffers are generally maintained in user memory space, which avoids the need for additional copy operations between a buffer within the operating system and a buffer within the end application that is sending or receiving the data. These types of RDMA transfers are sometimes referred to as "zero-copy" transfers.

Figure 8:
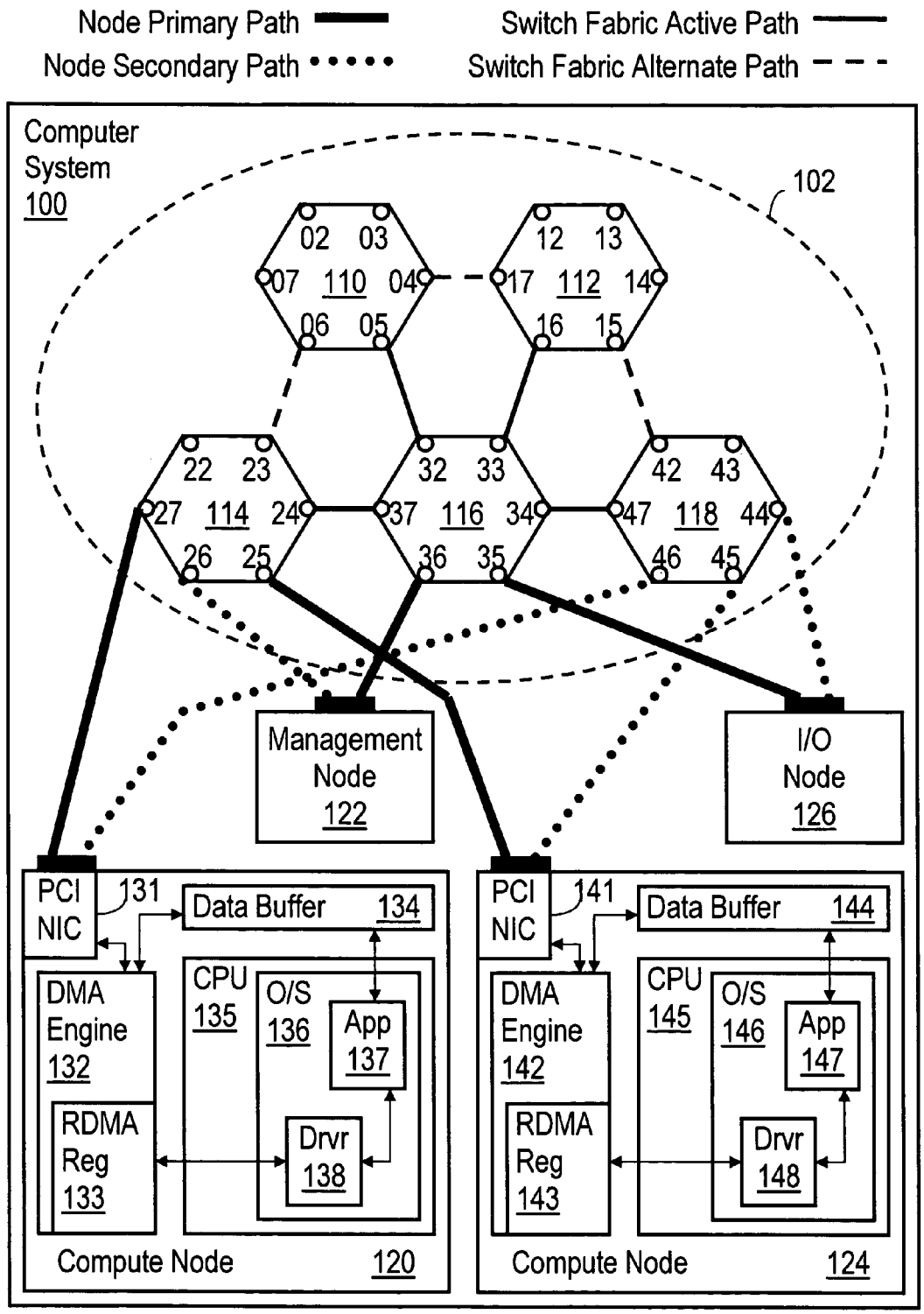
FIG. 8 shows the details of the compute nodes within a computer system constructed in accordance with at least some embodiments.

FIG. 8 illustrates how the RDMA transfer mechanism may be incorporated into the computer system 100 in accordance with at least some embodiments. Compute node 120 may comprise a CPU 135 executing application program (App) 137 and device driver (Drvr) 138 within an operating system environment (O/S) 136. Application program 137 may communicate with device driver 138, and may also access data within data buffer 134. Device driver 138 may access RDMA configuration register space (RDMA Reg) 133 within DMA Engine 132. DMA engine 132 may access data within data buffer 134, and may also couple to PCI network interface card (PCI NIC) 131. DMA engine 132 may communicate through PCI NIC 131 with other nodes coupled to the network switch fabric 102. Other compute nodes, for example compute node 124, may have a similar configuration.

In the computer system of FIG. 8, compute nodes 120 and 124 may each operate as separate, independent computers, even though they share a common network switch fabric. The two nodes may communicate with each other as if they were linked directly together by a virtual network (e.g., a TCP/IP network over Ethernet or over InfiniBand), despite the fact that the nodes are actually coupled by the underlying bus interconnect of the network switch fabric 102. By appearing as just another network, existing network mechanisms within the operating systems of the compute nodes may be used to transfer the data. For example, if application program 137 (executing on CPU 135 within compute node 120), needs to transfer data to application program 147 (executing on CPU 145 within computer node 124), it may accomplish this using an existing network transfer mechanism, such as, for example, a Unix socket mechanism. The application program 137 may obtain a socket from the operating system and then may populate the associated socket structure with all the relevant information needed for the transfer (e.g., IP address, port number, pointers data buffers, and transfer type).

Once the socket structure has been populated, the application program 137 may then forward the structure to the operating system 135 in a request to send data. Based on the IP address, the operating system 135 may route the request to device driver 138, which has access to the network comprising the requested IP address. This network, coupling compute node 120 and compute node 124 to each other, is actually a virtual network (e.g., Ethernet or InfiniBand), representing an abstraction layer that permits interoperability of the network switch fabric 102 with the existing network services provided by the operating system 135. The device driver may then process the request, and based on the information within the socket structure may then, if requested, configure DMA engine 132 for an RDMA transfer of data within the data buffer 134 to a destination location within the data buffer 144 of compute node 124. The device driver 138 may accomplish this by writing the required information into the RDMA configuration register space 133, and enabling the start of the transfer by the DMA engine 132.

Once the DMA engine 132 has begun to transfer data, data is read from the source buffer (in this example, data buffer 134) and formatted into RDMA messages. These messages may include RDMA headers, direct data placement (DDP) headers, and marker protocol data unit alignment (MPA) headers and markers. Once formatted, the DMA engine 132 sends the RDMA messages across the network switch fabric 102 by performing a data write across the underlying interconnect bus. In the illustrative embodiment of FIG. 8, the write is an encapsulated transaction sent across the network switch fabric 102 as a native PCI transaction (i.e., a memory, message, or I/O read or write transaction), wherein the data is the formatted RDMA message. The PCI transaction targets the DMA engine 142 of the target compute node 124, which is visible to the compute node 120 as a PCI end-device, identified during the enumeration process previously described. The DMA engine 142 then processes the received RDMA message and determines the location within the data buffer 144 to write the data. This process continues until all of the data specified in the request has been transferred into data buffer 144. Once the transfer is complete, application program 147 (executing on CPU 145 within compute node 124) may operate on the received data.

As already noted, the RDMA transfers may be executed using the native data transfer operations of the underlying interconnect bus architecture (e.g., PCI). The enumeration sequence of the illustrative embodiments previously described identifies each node within the computer system 100 as an end-device, and associates a unique, bus end-device identifier with each node. The identifiers allow RDMA messages to be directed by the source to the desired end-device. No additional encapsulation of the data is necessary for routing or message reordering purposes. This architecture allows the DMA engines 132 and 142 to send and receive RDMA messages at the full rate of the underlying interconnect, with less communication stack processing overhead than might be required if additional encapsulation were present. The use of RDMA transfers across the network switch fabric 102 of the illustrative embodiments also may reduce at least some of the data buffering requirements of the computer system 100. This can reduce data transfer latencies as compared to non zero-copy type data transfers.

Figure 9A:
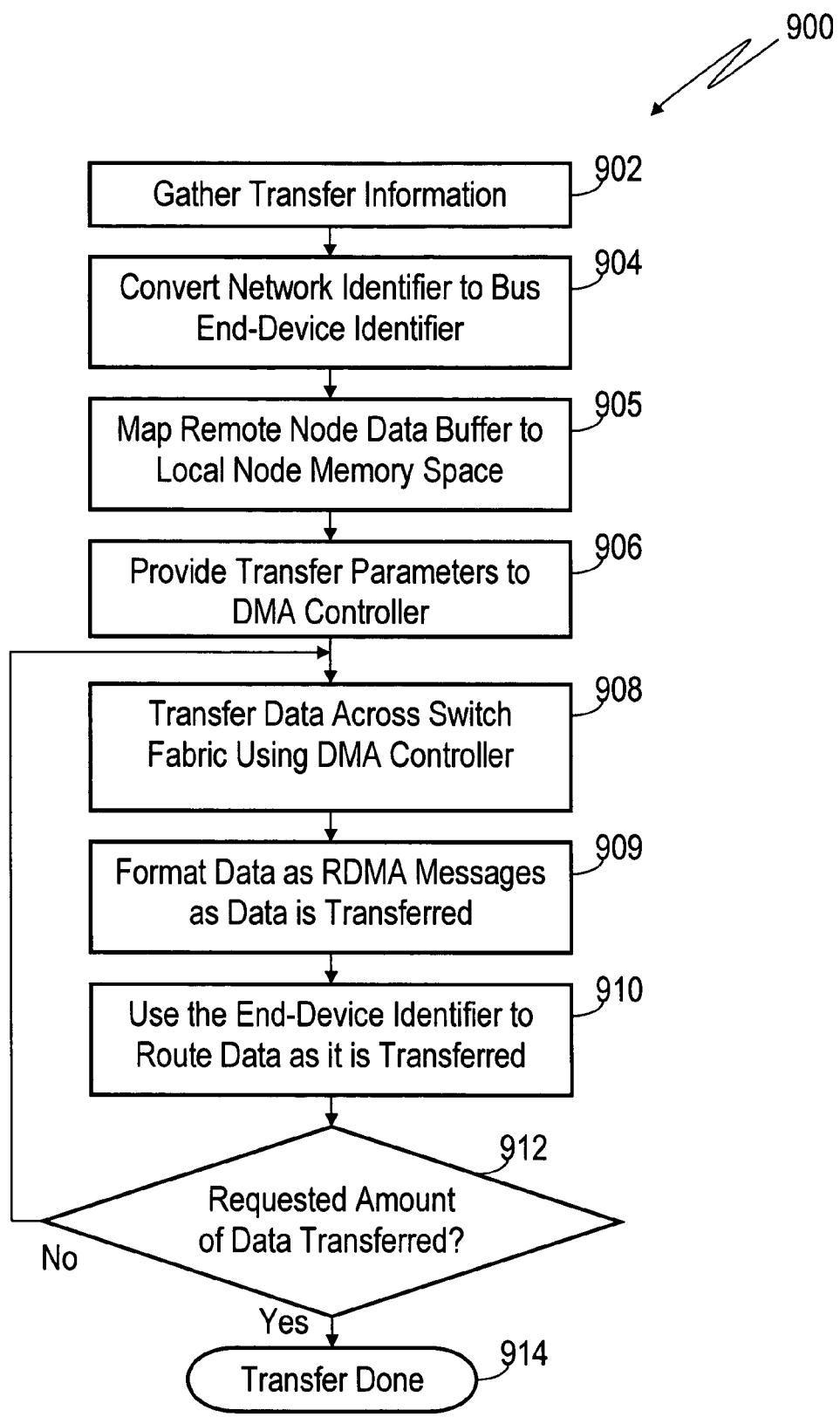
FIG. 9A shows a remote direct memory access (RDMA) method using on the fly RDMA formatting in accordance with at least some embodiments.

FIG. 9A illustrates a method 900 implementing an RDMA data transfer mechanism over a hierarchical network switch fabric, in accordance with at least some embodiments. Information needed for the transfer of the data is gathered as shown in block 902. This may include a network identifier of a remote node, information locating a local data buffer within the memory space of a local node, the type of transfer desired (e.g., zero-copy RDMA), and the amount of data to be transferred. Once the information has been gathered, the network identifier of the remote node is converted into a hierarchical bus end-device identifier (block 904), and a remote data buffer within the memory space of the remote node is mapped into the memory space of the local node (block 905). The network identifier is the same identifier that was assigned to the remote node during the enumeration process performed as part of the initialization of the network switch fabric 102 (see FIG. 8). Continuing to refer to FIG. 9A, the mapped remote buffer location, local buffer location and data transfer type are provided to the DMA controller (block 906) in preparation for the actual data transfer to be performed by the DMA controller. Once all of the necessary parameters have been provided to the DMA controller, the DMA controller begins to transfer data across the network switch fabric (block 908). As data is transferred, it is formatted on the fly into RMDA messages by the DMA controller (block 909). The network switch fabric routes the formatted RDMA messages to the remote node using the end-device identifier (block 910). The data transfer continues until the requested amount of data has been transferred (block 912) at which point the transfer is complete (block 914).

Figure 9B:
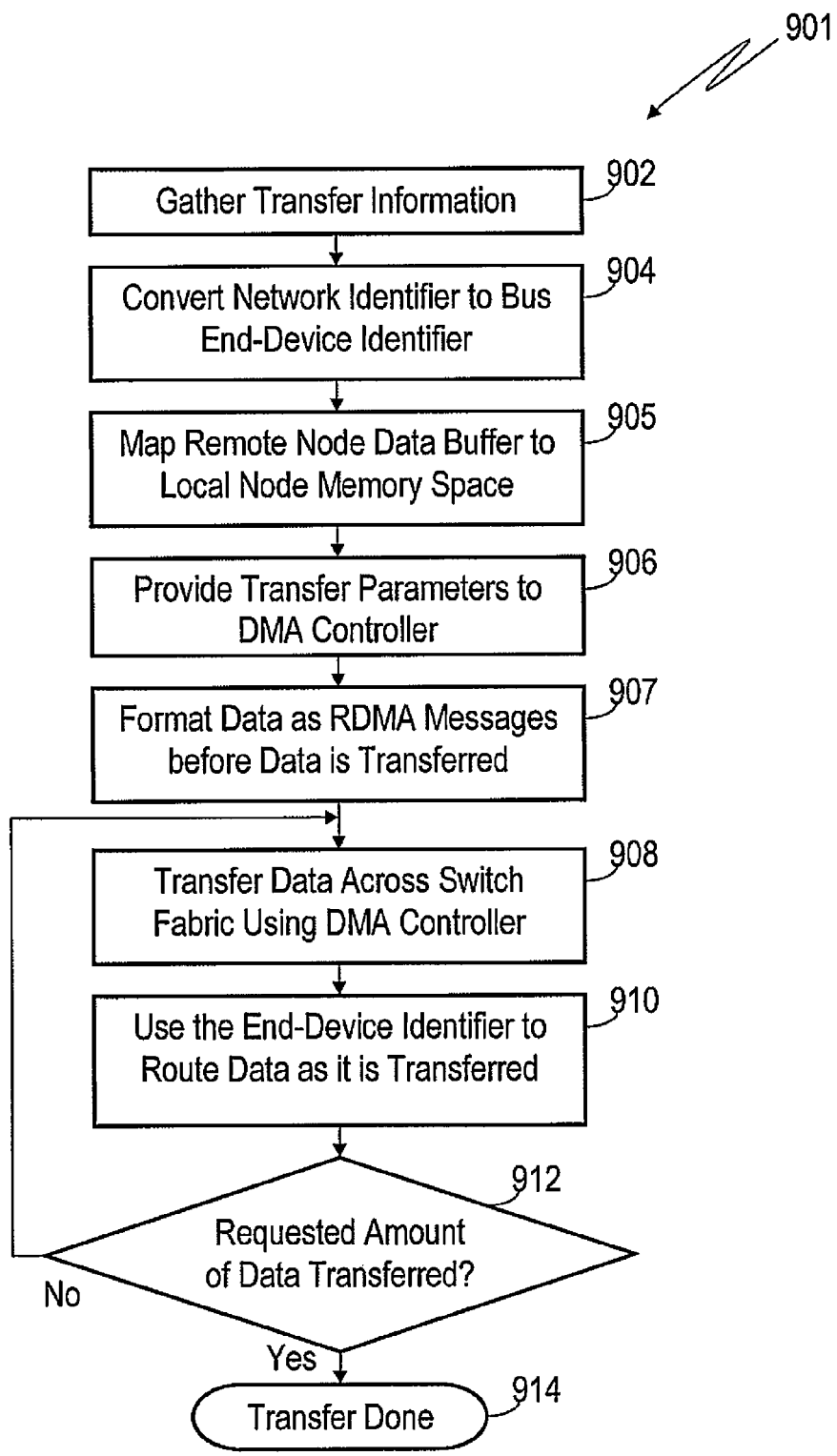
FIG. 9B shows an RDMA method using RDMA pre-formatting in accordance with at least some embodiments.

FIG. 9B illustrates an alternative method 901, similar to the method 900 of FIG. 9A. The method 901 of FIG. 9B differs in that the data is formatted into RDMA messages before being transferred, as shown in block 907, rather than formatted on the fly by the DMA controller, as shown in block 909 in FIG. 9A. The formatting in block 907 of FIG. 9B may be performed, for example, by application program 137 or by device driver 138 of FIG. 8.

The network visible to the operating system is a virtual network that functions as an abstraction layer over the network switch fabric 102 of FIG. 8. Transactions across the virtual network are encapsulated by the underlying network switch fabric 102 in a manner transparent to the various nodes coupled to the switch fabric. In the RDMA transaction described above, for example, the underlying PCI switch fabric encapsulates the RDMA message using native PCI transactions not directly visible to either end-device. Although only the RDMA message was encapsulated in the embodiment described, other embodiments may encapsulate a full TCP/IP message carrying an RDMA message as its payload. The underlying PCI transaction in such embodiments is directed to the appropriate PCI end-device by mapping the TCP/IP address to the PCI end-device ID. Other embodiments may encapsulate a fully formatted Ethernet message, which may encapsulate a TCP/IP message, which in turn may encapsulate the RDMA message. In this embodiment, the Ethernet MAC address is mapped to the appropriate PCI end-device ID.

In each of the embodiments, the underlying network switch fabric 102 of FIG. 8 provides a level of encapsulation not visible to the endpoints of the upper level protocol transaction thus encapsulated. Because of this, the architecture used by the switch fabric bears no relationship to the architecture of the virtual network that couples the nodes of the system. Thus, for example, the virtual network may implement TCP/IP over Ethernet, while the network switch fabric 102 may be implemented using PCI-Express. Other combinations of network and bus architectures may become apparent to those skilled in the art, and this disclosure is intended to encompass all such combinations.

The embodiments described illustrate a virtual network that couples various nodes operating as separate virtual machines. But this same virtualization may also be applied to various nodes within the system that operate together as components of a single virtual machine. Thus compute node 120 of FIG. 8 may communicate across the network switch fabric 102 with I/O node 126 as if it were directly coupled to the internal bus of compute node 120. The underlying network switch fabric 102 encapsulates the lower level protocol transaction of the compute node 120 in the same manner as the upper level protocol transaction described above. Thus, for example, a PCI-X based compute node 120 coupled to a PCI-Express-based network switch fabric 102 can communicate with a PCI-X based I/O node 126 as if it were coupled directly to the internal PCI-X bus of compute node 120. The transaction that is sent across the network switch fabric 102 would be a PCI-X transaction encapsulated by a native PCI-Express transaction. Again, because the architecture of this "virtual bus" bears no relationship with the architecture of the underlying switch fabric, numerous combinations are possible. Thus, for example, the virtual machine may use an Infiniband bus protocol to communicate between its components, but utilize an underlying PCI-based network switch fabric 102.

Figure 10:
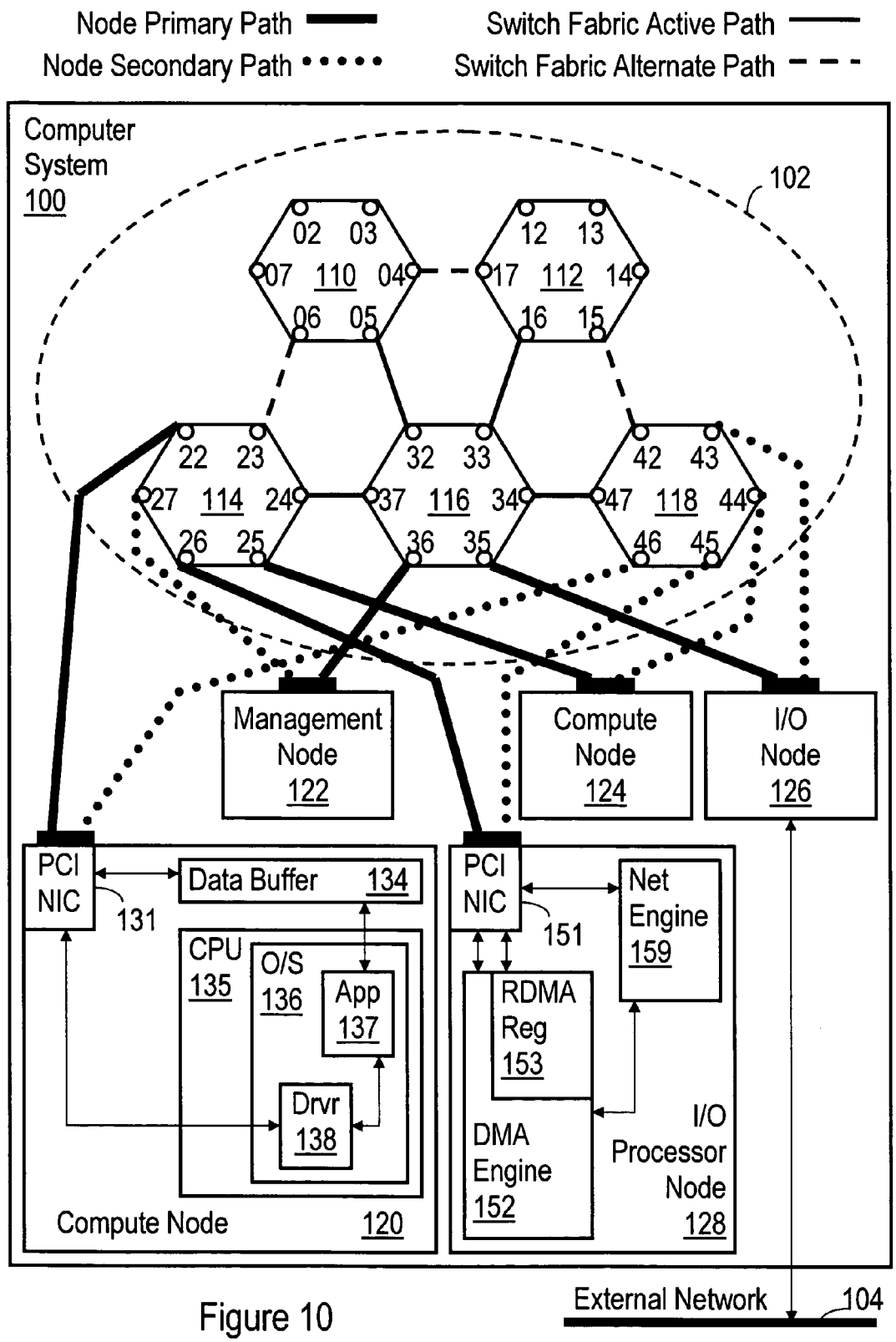
FIG. 10 shows the details of the compute node and the I/O processor node within a computer system constructed in accordance with at least some embodiments.

The virtual bus described also allows individual virtual machine functions to be implemented together within a single node, or distributed among multiple nodes. An RDMA transaction of some embodiments may be executed on the compute node 120 using a combination of the device driver 132, DMA engine 132, and PCI NIC 131. In other embodiments, other nodes may transparently handle portions of the RDMA transaction. FIG. 10 illustrates an embodiment, wherein a separate I/O processor node 128 implements the upper level protocol encapsulations (e.g., Ethernet, TCP/IP, and RDMA) of the RDMA transaction. The I/O processor node 128 may comprise a network protocol engine (Net Engine) 159, which couples to a DMA engine 152 comprising an RDMA configuration register space (RDMA reg.) 153, and to a PCI NIC 151. The PCI NIC 151 may also couple to both the DMA engine 152 and the network switch fabric 102.

The compute node 120 sets up an RDMA transaction on the I/O compute node 128 across the virtual bus as if the RDMA configuration register space were directly mapped within the memory space of the compute node 120. The I/O processor node 128 may then format the upper level protocol transaction and executes the transfer. In an RDMA transaction with another system (not shown) external to computer system 100, the I/O processor node 128 may gain access to external network 104 through I/O node 126, using network protocol engine 159 to format (outgoing) or process (incoming) the network message accordingly. I/O node 126 also appears as if it were directly attached to the same virtual bus, even though it is a physically distinct node coupled to the underlying network switch fabric 102. The I/O processor node 128 and I/O node 126 may both be configured to process messages using a variety of different network protocols (e.g., Ethernet, Fiber Channel, and Infiniband), and this disclosure is intended to encompass all such embodiments.

The various virtualizations described (machines and networks), may be combined to operate simultaneously over a single network switch fabric 102. For example, referring again to FIG. 8, compute node 120 may operate as a virtual machine that communicates with I/O node 126 using PCI transactions encapsulated by an underlying PCI-Express switch fabric 102. The same virtual machine may communicate with a second virtual machine (comprising compute node 124) over a virtual network using TCP/IP over Ethernet transactions encapsulated by the same underlying PCI-Express network switch fabric 102.

The above discussion is meant to be illustrative of the principles and various embodiments of the present invention. Numerous variations and modifications will become apparent to those skilled in the art once the above disclosure is fully appreciated. For example, although some of the embodiments are described in the context of a PCI bus architecture, other similar bus architectures may also be used (e.g., Hyper-Transport, Rapid IO). Many other embodiments are within the scope of the present disclosure, and it is intended that the following claims be interpreted to embrace all such variations and modifications.

What is claimed is:

1. A system, comprising:
    a first system node;
    a direct memory access (DMA) controller;
    a second system node; and
    a network switch fabric coupling together the first and second system nodes, the network switch fabric comprises a rooted hierarchical bus;
    wherein the DMA controller is configured to perform a DMA transfer of data between the first and second system nodes across the network switch fabric; and
    wherein the data is formatted as one or more remote DMA (RDMA) protocol messages that are routed across the network switch fabric based on a bus end-device identifier corresponding to the second system node;
    wherein the network switch fabric provides an active path between the first system node and the second system node that facilitates a first data packet exchange that travels along a first path constrained within a hierarchy of the rooted hierarchical bus; and
    wherein the network switch fabric further provides an alternate path between the first system node and the second system node that facilitates a second data packet exchange that travels along a second path at least part of which is not constrained within the hierarchy of the rooted hierarchical bus;
    wherein a third system node, coupled to the network switch fabric, comprises said DMA controller.

2. The computer system of claim 1, further comprising a virtual machine, comprising:
    the first system node;
    the third system node; and
    a virtual bus between the first and third system node;
    wherein a message is transferred between the first and third system nodes, the message formatted according to a first bus protocol defined for the virtual bus; and
    wherein the message is encapsulated according to a second bus protocol defined for the network switch fabric.

3. The computer system of claim 2, wherein the first and second bus protocols are the same.

4. The computer system of claim 2, wherein the first and second bus protocols are different.

5. The computer system of claim 2, wherein the first bus protocol comprises at least one of the group consisting of a peripheral component interconnect (PCI) bus protocol, a PCI-Express bus protocol, and a PCI extended (PCI-X) bus protocol.

6. The computer system of claim 2, wherein the second bus protocol comprises at least one of the group consisting of a peripheral component interconnect (PCI) bus protocol, a PCI-Express bus protocol, and a PCI extended (PCI-X) bus protocol.

7. The computer system of claim 1, further comprising:
    a first virtual machine comprising the first system node;
    a second virtual machine comprising the second system node; and
    a virtual network between the first and second virtual machines;
    wherein a message is transferred between the first and second virtual machines, the message formatted according to a network protocol defined for the virtual network; and
    wherein the message is encapsulated according to a bus protocol defined for the network switch fabric.

8. The computer system of claim 7, wherein the network protocol comprises at least one of the group consisting of an Ethernet network protocol, and a TCP/IP network protocol.

9. The computer system of claim 7, wherein the bus protocol comprises at least one of the group consisting of a peripheral component interconnect (PCI) bus protocol, a PCI-Express bus protocol, and a PCI extended (PCI-X) bus protocol.

10. The computer system of claim 1, wherein the DMA transfer comprises a zero-copy data transfer.

11. The computer system of claim 1, wherein the first system node is a data processing node.

12. The computer system of claim 1, wherein the second system node is a data processing node.

13. The computer system of claim 1, wherein the second system node comprises an Ethernet network interface configured to couple to an external Ethernet network.

14. The computer system of claim 1, wherein the rooted hierarchical bus comprises at least one of the group consisting of a peripheral component interconnect (PCI) bus architecture, a PCI-Express bus architecture, and a PCI extended (PCI-X) bus architecture.

15. The computer system of claim 1, wherein the first system node further comprises a network interface card (NIC) that couples the first system node to the network switch fabric, and the NIC comprises the DMA controller.

16. The computer system of claim 1, wherein the DMA controller formats the data as the one or more RDMA messages.

17. The computer system of claim 1, wherein the first system node further comprises a processor, and the processor formats the data as the one or more RDMA messages.

18. A method, comprising:
gathering data transfer information comprising a network identifier of a remote node, a local data buffer location, and data transfer type information;
converting the network identifier into a corresponding hierarchical bus end-device identifier;
mapping a remote data buffer with a memory space of the remote node to a memory space of a local node;
providing transfer parameters to a direct memory access (DMA) controller, the transfer parameters comprising the memory mapped remote data buffer location, the local data buffer location, and the data transfer type;
transferring data across a network switch fabric using the DMA controller, an independent node housing said DMA controller, the independent node couples to the remote node and the local data buffer location by way of the network switch fabric, the transferring controlled by the transfer parameters provided, and the network switch fabric comprising a hierarchical bus, the data passed along a first path constrained within a hierarchy of the hierarchical bus;
routing the data as it is transferred across the network switch fabric, the routing based on the hierarchical bus end-device identifier;
formatting the data as one or more remote DMA (RDMA) protocol messages; and
transferring additional data across said network via an alternate path, said data transferred via a second path at least part of which is not constrained within the hierarchy of the hierarchical bus;
wherein the data is formatted while said data is transferred.

* * * * *